US012806887B2

(12) United States Patent
Yamazaki et al.

(10) Patent No.: US 12,806,887 B2
(45) Date of Patent: Nov. 24, 2026

(54) PLASTIC CONTAINER

(71) Applicant: KYORAKU CO., LTD., Kyoto (JP)

(72) Inventors: Daisuke Yamazaki, Tokyo (JP); Takatoshi Kurosaki, Gifu (JP)

(73) Assignee: KYORAKU CO., LTD, Kyoto (JP)

( * ) Notice: Subject to any disclaimer, the term of this patent is extended or adjusted under 35 U.S.C. 154(b) by 74 days.

(21) Appl. No.: 18/845,536

(22) PCT Filed: Mar. 27, 2023

(86) PCT No.: PCT/JP2023/012120
§ 371 (c)(1),
(2) Date: Sep. 10, 2024

(87) PCT Pub. No.: WO2023/190296
PCT Pub. Date: Oct. 5, 2023

(65) Prior Publication Data

US 2025/0187313 A1 Jun. 12, 2025

(30) Foreign Application Priority Data

Mar. 30, 2022 (JP) ................................ 2022-057384

(51) Int. Cl.

| | |
|---|---|
| ***B32B 27/00*** | (2006.01) |
| ***B32B 1/00*** | (2024.01) |
| ***B32B 7/02*** | (2019.01) |
| ***B32B 7/12*** | (2006.01) |
| ***B65D 65/40*** | (2006.01) |

(52) U.S. Cl.
CPC ................ *B32B 27/00* (2013.01); *B32B 1/00* (2013.01); *B32B 7/02* (2013.01); *B32B 7/12* (2013.01); *B65D 65/40* (2013.01); *B32B 2250/05* (2013.01); *B32B 2250/24* (2013.01); *B32B 2307/7242* (2013.01); *B32B 2439/60* (2013.01)

(58) Field of Classification Search
CPC .. B32B 27/00; B32B 1/00; B32B 7/02; B32B 7/12; B32B 2250/05; B32B 2250/24; B32B 2307/7242; B32B 2439/60; B65D 65/40
See application file for complete search history.

(56) References Cited

U.S. PATENT DOCUMENTS

2015/0041465 A1 2/2015 Komatsu et al.

FOREIGN PATENT DOCUMENTS

| | | | | | |
|---|---|---|---|---|---|
| JP | 2001253426 A | | 9/2001 | | |
| JP | 2016190654 A | | 11/2016 | | |
| JP | 2018135133 A | * | 8/2018 | | |
| WO | 2018/037979 A1 | | 3/2018 | | |
| WO | 2019230929 A1 | | 12/2019 | | |
| WO | WO-2022045248 A1 | * | 3/2022 | ............... | B65D 1/00 |

OTHER PUBLICATIONS

Machine Translation of Kametani et al. (WO 2022045248 A1) (Year: 2022).*
Machine Translation of Yamada et al. (JP 2018135133 A) (Year: 2018).*
Extended Search Report issued on Feb. 27, 2025, in corresponding European Application No. 23780306.9, 7 pages.
International Search Report issued on May 16, 2023, in corresponding International Application No. PCT/JP2023/012120; 4 pages (with English-language translation).

* cited by examiner

*Primary Examiner* — Callie E Shosho
*Assistant Examiner* — Bethany M Miller
(74) *Attorney, Agent, or Firm* — Maier & Maier, PLLC

(57) ABSTRACT

The present invention provides a plastic container with excellent recyclability. According to the present invention, plastic container for containing a content, wherein the plastic container includes, in order from the inner surface side, an inner layer, an inner adhesive layer, a gas barrier layer, an outer adhesive layer, and an outer layer, and a content rate of EVOH resin in the plastic container is 5% by mass or less.

3 Claims, 2 Drawing Sheets

PLASTIC CONTAINER

TECHNICAL FIELD

The present invention relates to a plastic container.

BACKGROUND ART

Patent Literature 1 discloses a plastic container capable of containing contents such as mayonnaise.

CITATION LIST

Patent Literature

[Patent Literature 1] JP-A-2016-190654

SUMMARY OF INVENTION

Technical Problem

By the way, the plastic containers such as those described in Patent Literature 1 consume a large amount of plastic, so from a viewpoint of environmental measures, monomaterialization of materials (single material), and consequently improved recyclability through monomaterialization, is strongly desired.

The present invention has been made in view of such circumstances, and provides a plastic container with excellent recyclability.

Solution to Problem

According to the present invention, plastic container for containing a content, wherein the plastic container includes, in order from the inner surface side, an inner layer, an inner adhesive layer, a gas barrier layer, an outer adhesive layer, and an outer layer, and a content rate of EVOH resin in the plastic container is 5% by mass or less.

By having such a configuration, since the content rate of different types of constituent materials (EVOH resin) becomes smaller, in other words, the content of the same type of constituent materials increases, it is possible to improve recyclability by promoting monomaterialization of the plastic container. That is, it is possible to provide a plastic container with excellent recyclability.

Hereinafter, various embodiments of the present invention will be described. The embodiments described hereinafter can be combined with each other.

Preferably, the plastic container includes a repro layer between the inner layer and the inner adhesive layer, and a thickness of the inner adhesive layer is smaller than a thickness of the outer adhesive layer.

Preferably, the plastic container includes a repro layer between the inner layer and the inner adhesive layer, and a ratio of a thickness of the gas barrier layer to a thickness of the inner adhesive layer or the outer adhesive layer is 4.0 or more.

DESCRIPTION OF EMBODIMENTS

Hereinafter, embodiments of the present invention will be described. Various characteristics in the embodiments described below can be combined with each other. Further, the invention is independently established for each characteristic.

1. Configuration of Plastic Container

Figure 1:
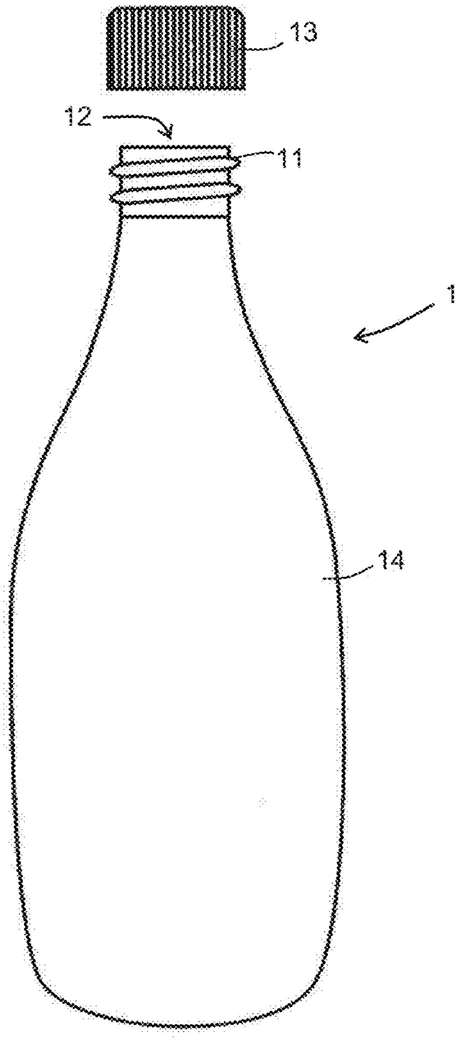
FIG. 1 is a front view showing a plastic container 1 and a cap 13.

FIG. 1 shows a schematic diagram of the plastic container 1 according to an embodiment of the invention. As shown in FIG. 1, the plastic container 1 is a container that contains contents. The contents include viscous substances such as mayonnaise and ketchup.

The plastic container 1 is for squeezing a body 14 etc. to release the contents from a spout 12 where a screw thread 11 is formed. Usually, the spout 12 is sealed with a cap 13 attached thereto. The plastic container 1 is a blow molded body formed by blow molding. Details of blow molding will be described later.

Figure 2:
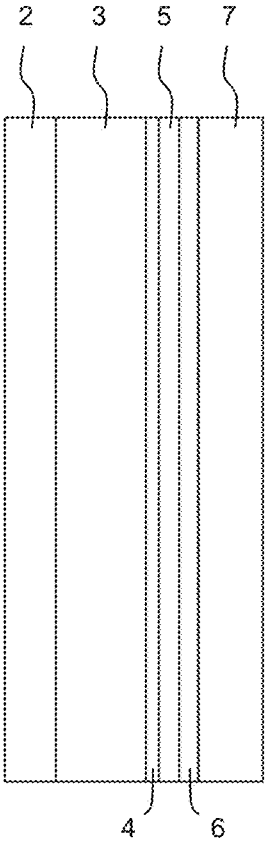
FIG. 2 is a diagram showing a configuration of the layers of the plastic container 1.

The plastic container 1 has a multilayer structure. FIG. 2 shows an example of the structure of the layers of the plastic container 1. The plastic container 1 includes, in order from the inner surface of the plastic container 1, an innermost layer 2 (corresponding to the "inner layer" of the present invention), a repro layer 3, an adhesive resin layer 4 (corresponding to the "inner adhesive layer" of the present invention), a gas barrier layer 5, an adhesive resin layer 6 (corresponding to the "outer adhesive layer" of the present invention) and an outermost layer 7 (corresponding to the "outer layer" of the present invention). The configuration of the layers of the plastic container 1 may include another layer in addition to these layers.

The content rate of EVOH (ethylene vinyl alcohol copolymer) resin in the plastic container 1 is 4.5 to 5% by mass, that is, 5% by mass or less. Specifically, the content rate of EVOH resin in the plastic container 1 is, for example, 4.5, 4.6, 4.7, 4.8, 4.9, and 5.0% by mass, and can be in the range between the two values exemplified herein. By having such a configuration, since the content rate of different types of constituent materials (EVOH resin) becomes smaller, in other words, the content of the same type of constituent materials increases, it is possible to improve recyclability by promoting monomaterialization of the plastic container 1. This is particularly useful to promote monomaterialization of the relatively large plastic container 1that has an internal capacity of 300 g or more. That is, it is possible to provide the plastic container 1 with excellent recyclability.

The ratio of the thickness of each layer to the thickness of the plastic container 1 (side wall) is, for example, as follows.

the innermost layer 2: 5 to 20%
the repro layer 3: 30 to 60%
the adhesive resin layer 4: 0.2 to 3%
the gas barrier layer 5: 1 to 4%
the adhesive resin layer 6: 0.2 to 3%
the outermost layer 7: 20 to 50%

Each layer will be explained below.

(Innermost Layer 2)

The innermost layer 2 is a layer disposed at the innermost side of the plastic container 1 and in contact with the content, and is made of a resin composition containing a resin (preferably a thermoplastic resin). Examples of the resin include polyolefin (for example, polyethylene, polypropylene), polyester (for example, PET), EVOH, nylon, etc. The resin composition may contain only a resin, or may contain a resin and an additive. Examples of additives include lubricants and fillers, etc.

(Outermost Layer 7)

The outermost layer 7 is an outermost layer of the plastic container 1, and is made of a resin composition containing a resin (preferably a thermoplastic resin). Examples of the resin include polyolefin (for example, polyethylene, polypropylene), polyester (for example, PET), EVOH, nylon, etc. The resin composition may contain only a resin, or may contain a resin and an additive. Examples of additives include lubricants and fillers, etc. The outermost layer 7 and the innermost layer 2 are made of the same kind of material.

(Repro Layer 3)

The repro layer 3 is arranged between the innermost layer 2 and the outermost layer 7. The repro layer 3 is composed of a resin composition containing a repro material obtained by recycling scrap generated during molding of the plastic container 1. The scrap includes all layers of the plastic container 1 (the innermost layer 2, the repro layer 3, the adhesive resin layers 4 and 6, the gas barrier layer 5, and the outermost layer 7). Therefore, the repro material is a mixture of resin compositions constituting each of all the layers of the plastic container 1. The repro layer 3 may include the same resin as the innermost layer 2 (the outermost layer 7) in addition to the repro material. Moreover, the repro layer 3 may be configured to include the same kind of material as the innermost layer 2 (the outermost layer 7), which is the main component of the repro material. In particular, by being configured to contain biomass resin as a material similar to repro materials, the plastic container 1 can be made more environmentally friendly.

(Gas Barrier Layer 5)

The gas barrier layer 5 is made of resin with high gas barrier property. Examples of such resins include EVOH and aromatic polyamide, etc. By providing the gas barrier layer 5, it is possible to effectively suppress oxidative deterioration of the contents due to oxygen permeation.

The gas barrier layer 5 is preferably arranged between the repro layer 3 and the outermost layer 7. By arranging the gas barrier layer 5 at a position closer to the outermost layer 7 than the repro layer 3, the relative humidity of the gas barrier layer 5 is suppressed from increasing due to moisture in the contents. For EVOH, the oxygen permeation rate increases as the relative humidity increases. Therefore, by arranging the gas barrier layer 5 at a position closer to the outermost layer 7 than the repro layer 3, it is possible to suppress an increase in the oxygen permeation rate. It is more desirable that the ethylene content rate of EVOH is 27 mol % or less.

(Adhesive Resin Layers 4, 6)

The adhesive resin layers 4 and 6 are made of adhesive resin. Examples of adhesive resins include acid-modified polyolefin resins (for example, maleic anhydride-modified polyethylene, maleic anhydride-modified polypropylene), etc. By providing the adhesive resin layers 4 and 6, it is possible to improve the adhesiveness between the gas barrier layer 5 and the outermost layer 7 or the repro layer 3.

From the perspective of promoting monomaterialization of plastic container 1 and improving recyclability, it is preferable to reduce the amount of the adhesive resin layer 4 in the plastic container 1 by making the thickness of the adhesive resin layer 4 smaller than the thickness of the adhesive resin layer 6. The repro layer 3 is configured to contain a resin composition that constitutes the adhesive resin layers 4 and 6. Therefore, even if the thickness of the adhesive resin layer 4 is made smaller than the thickness of the adhesive resin layer 6, it is possible to ensure the adhesiveness between the gas barrier layer 5 and the repro layer 3.

In addition, from the perspective of promoting monomaterialization of the plastic container 1 and improving recyclability, it is preferable to reduce the amount of the adhesive resin layers 4 and 6 in the plastic container 1 by setting the ratio of the thickness of the gas barrier layer 5 to the thickness of the adhesive resin layers 4 and 6 to be 4.0 or more, that is, by making the thickness of the adhesive resin layers 4 and 6 smaller than the gas barrier layer 5. The repro layer 3 is configured to contain a resin composition that constitutes the adhesive resin layers 4 and 6. Therefore, even if the thickness of the adhesive resin layer 4 is reduced, it is possible to ensure the adhesiveness between the gas barrier layer 5 and the repro layer 3. The ratio of the thickness of the gas barrier layer 5 to the thickness of the adhesive resin layers 4 and 6 is preferably 4.0 to 10.0, specifically, for example, 4.0, 5.0, 6.0, 7.0, 8.0, 9.0, and 10.0, and can be in the range between the two values exemplified herein.

2. Method of Manufacturing Plastic Container

The plastic container 1 can be formed by blow molding a parison. Blow molding may be direct blow molding or injection blow molding. In direct blow molding, the plastic container 1 is manufactured by sandwiching a molten cylindrical parison extruded from an extruder between a pair of split molds and blowing air into the parison. In injection blow molding, a test tube-shaped parison with a bottom called a preform is formed by injection molding, and blow molding is performed using this parison.

In any blow molding, the layer configuration of the parison is the same as that of the plastic container 1. Multilayer parisons can be formed by coextrusion, multilayer injection molding, etc.

When forming the plastic container 1 by direct blow molding, the portion inside a cavity formed by a pair of split molds in a cylindrical parison becomes the plastic container 1, and the portion other than the plastic container 1 becomes scrap. This scrap contains the constituent materials of all the layers that constitutes the plastic container 1. A repro material can be obtained by subjecting this scrap to a recycling processing such as crushing.

EXAMPLE

1. Manufacturing Plastic Container 1

Example 1

A plastic container 1 (inner capacity: 400 g) having the shape shown in FIG. 1 and the layer configuration shown in FIG. 2 was manufactured. The plastic container 1 was manufactured by coextruding the resin or resin composition to extrude a cylindrical parison from a multilayer die head and performing known direct blow molding. The content rate of EVOH resin in the plastic container 1 is 4.5% by mass. From the viewpoint of promoting monomaterialization of the plastic container 1 and improving recyclability, the thickness of the adhesive resin layer 4 is made smaller than the thickness of the adhesive resin layer 6, thereby reducing the amount of the adhesive resin layer 4 in the plastic container 1. Since the repro layer 3 is configured to contain the resin composition that constitutes the adhesive resin layers 4 and 6, even if the thickness of the adhesive resin layer 4 is smaller than the thickness of the adhesive resin layer 6, it is possible to ensure the adhesiveness between the gas barrier layer 5 and the repro layer 3. The ratio of the thickness of each layer (composition) to the thickness of the plastic container 1 (side wall) is as follows. It is noted that the ratio of the thickness of each layer to the thickness of the plastic container 1 means the average value of the ratios measured at 12 points in the circumferential direction at a height of 90 mm from the bottom of the plastic container 1.

the innermost layer 2 (low density polyethylene (LDPE)): 14.4% the repro layer 3 (repro material): 48.1% the adhesive resin layer 4 (acid-modified polyolefin resin): 1.3% the gas barrier layer 5 (EVOH, ethylene ratio: 27 mol %): 2.9% the adhesive resin layer 6 (acid-modified polyolefin resin): 2.0% the outermost layer 7 (low density polyethylene (LDPE)): 31.3%

The properties of the plastic container 1 are as follows.

Container weight: 16.26 g

Bottle height: 200.60 mm

Nozzle bottom height: 195.72 mm

Top height of screw part: 192.10 mm

Shoulder height: 178.06 mm

Shoulder-nozzle bottom height: 17.66 mm

Shoulder-screw top height: 14.03 mm

Nozzle height: 22.54 mm

Mouth outer diameter: 17.68 mm

Nozzle inner diameter: 14.91 mm

Seal thickness: 1.39 mm

Nozzle lower diameter: 16.64 mm

Screw thread diameter: 22.34 mm

Screw valley diameter: 20.33 mm

Shoulder diameter: 28.28 mm

Body width (major axis/minor axis): 76.0 mm/53.3 mm

Body width major axis/mouth outer diameter: 76.0 mm/17.68 mm (4.3)

Minimum wall thickness: 0.24 mm

Buckling strength: 3.70 kgf (measured by compressing the mouth of an empty container (compressive strength: 50 mm/min))

The wall thickness distribution of the plastic container 1 is as shown in Table 1 below. The wall thickness distribution was measured at 17 locations at 10 mm intervals from the bottom of the plastic container 1 and at 12 locations in the circumferential direction.

TABLE 1

| HEIGHT | CIRCUMFERENTIAL MESUAREMENT POSITION | | | | | | | | | | | |
|---|---|---|---|---|---|---|---|---|---|---|---|---|
| DIRECTION | 1 | 2 | 3 | 4 | 5 | 6 | 7 | 8 | 9 | 10 | 11 | 12 |
| 17 | 0.822 | 0.852 | 0.798 | 0.702 | 0.702 | 0.797 | 0.866 | 0.836 | 0.750 | 0.663 | 0.641 | 0.717 |
| 16 | 0.694 | 0.721 | 0.695 | 0.623 | 0.593 | 0.679 | 0.730 | 0.702 | 0.679 | 0.554 | 0.508 | 0.605 |
| 15 | 0.573 | 0.635 | 0.587 | 0.580 | 0.482 | 0.550 | 0.623 | 0.607 | 0.537 | 0.512 | 0.413 | 0.482 |
| 14 | 0.497 | 0.561 | 0.519 | 0.535 | 0.419 | 0.481 | 0.539 | 0.530 | 0.460 | 0.486 | 0.343 | 0.418 |
| 13 | 0.455 | 0.509 | 0.460 | 0.488 | 0.371 | 0.427 | 0.487 | 0.468 | 0.417 | 0.426 | 0.299 | 0.368 |
| 12 | 0.421 | 0.479 | 0.423 | 0.453 | 0.343 | 0.398 | 0.453 | 0.436 | 0.383 | 0.384 | 0.268 | 0.334 |
| 11 | 0.417 | 0.475 | 0.423 | 0.426 | 0.328 | 0.386 | 0.444 | 0.428 | 0.361 | 0.367 | 0.261 | 0.331 |
| 10 | 0.424 | 0.481 | 0.449 | 0.431 | 0.333 | 0.386 | 0.451 | 0.432 | 0.361 | 0.364 | 0.265 | 0.330 |
| 9 | 0.425 | 0.481 | 0.423 | 0.436 | 0.330 | 0.396 | 0.460 | 0.432 | 0.369 | 0.371 | 0.263 | 0.329 |
| 8 | 0.419 | 0.475 | 0.420 | 0.440 | 0.327 | 0.381 | 0.441 | 0.423 | 0.374 | 0.374 | 0.261 | 0.322 |
| 7 | 0.404 | 0.464 | 0.421 | 0.435 | 0.324 | 0.371 | 0.442 | 0.421 | 0.366 | 0.373 | 0.251 | 0.315 |
| 6 | 0.389 | 0.441 | 0.416 | 0.428 | 0.314 | 0.356 | 0.426 | 0.395 | 0.364 | 0.360 | 0.247 | 0.306 |
| 5 | 0.372 | 0.423 | 0.412 | 0.421 | 0.309 | 0.341 | 0.408 | 0.383 | 0.358 | 0.343 | 0.242 | 0.286 |
| 4 | 0.354 | 0.409 | 0.416 | 0.416 | 0.320 | 0.330 | 0.392 | 0.366 | 0.365 | 0.344 | 0.243 | 0.278 |
| 3 | 0.344 | 0.408 | 0.452 | 0.433 | 0.334 | 0.332 | 0.383 | 0.377 | 0.395 | 0.351 | 0.258 | 0.275 |
| 2 | 0.340 | 0.417 | 0.469 | 0.448 | 0.353 | 0.339 | 0.388 | 0.374 | 0.421 | 0.373 | 0.264 | 0.275 |
| 1 | 0.337 | 0.420 | 0.511 | 0.463 | 0.368 | 0.342 | 0.375 | 0.376 | 0.449 | 0.379 | 0.282 | 0.277 |

Example 2

A plastic container 1 (inner capacity: 360 g) having the shape shown in FIG. 1 and the layer configuration shown in FIG. 2 was manufactured. The plastic container 1 was manufactured by coextruding the resin or resin composition to extrude a cylindrical parison from a multilayer die head and performing known direct blow molding. The content rate of EVOH resin in the plastic container 1 is 5.0% by mass. The ratio of the thickness of the gas barrier layer 5 to the thickness of the adhesive resin layers 4 and 6 was set to 5.0. That is, from the viewpoint of promoting monomaterialization of the plastic container 1 and improving recyclability, the thickness of the adhesive resin layers 4 and 6 is made smaller than the thickness of the gas barrier layer 5, thereby reducing the amount of the adhesive resin layers 4 and 6 in the plastic container 1. Since the repro layer 3 is configured to contain the resin composition that constitutes the adhesive resin layers 4 and 6, even if the thickness of the adhesive resin layer 4 is smaller than the thickness of the adhesive resin layer 6, it is possible to ensure the adhesiveness between the gas barrier layer 5 and the repro layer 3.

The ratio of the thickness of each layer (composition) to the thickness of the plastic container 1 (side wall) is as follows. It is noted that the ratio of the thickness of each layer to the thickness of the plastic container 1 means the average value of the ratios measured at four points in the circumferential direction at a height of 50 mm from the bottom of the plastic container 1.

The innermost layer 2 (low density polyethylene (LDPE)): 12.4% the repro layer 3 (repro material): 46.6% the adhesive resin layer 4 (acid-modified polyolefin resin): 0.6% the gas barrier layer 5 (EVOH, ethylene ratio: 27 mol %): 3.0% the adhesive resin layer 6 (acid-modified polyolefin resin): 0.6% the outermost layer 7 (low density polyethylene (LDPE)): 36.8%

The properties of the plastic container 1 are as follows.

Container weight: 14.81 g

Bottle height: 189.60 mm

Nozzle bottom height: 185.05 mm

Top height of screw part: 181.46 mm

Shoulder height: 167.47 mm

Shoulder-nozzle bottom height: 17.58 mm

Shoulder-screw top height: 13.99 mm

Nozzle height: 22.12 mm

Mouth outer diameter: 17.69 mm

Nozzle inner diameter: 14.80 mm

Seal thickness: 1.43 mm
Nozzle lower diameter: 16.76 mm
Screw thread diameter: 22.35 mm
Screw valley diameter: 20.28 mm
Shoulder diameter: 28.54 mm
Body width (major axis/minor axis): 70.7 mm/47.7 mm
Body width major axis/mouth outer diameter: 70.7 mm/17.69 mm (4.0)
Minimum wall thickness: 0.27 mm
Buckling strength: 4.80 kgf (measured by compressing the mouth of an empty container (compressive strength: 50 mm/min))

The wall thickness distribution of the plastic container 1 is as shown in Table 2 below. The wall thickness distribution was measured at 16 locations at 10 mm intervals from the bottom of the plastic container 1 and at 12 locations in the circumferential direction.

TABLE 2

| HEIGHT | CIRCUMFERENTIAL MESUAREMENT POSITION | | | | | | | | | | | |
|---|---|---|---|---|---|---|---|---|---|---|---|---|
| DIRECTION | 1 | 2 | 3 | 4 | 5 | 6 | 7 | 8 | 9 | 10 | 11 | 12 |
| 16 | 0.789 | 0.806 | 0.810 | 0.722 | 0.724 | 0.791 | 0.823 | 0.881 | 0.912 | 0.779 | 0.710 | 0.793 |
| 15 | 0.550 | 0.577 | 0.595 | 0.542 | 0.509 | 0.555 | 0.570 | 0.639 | 0.682 | 0.578 | 0.499 | 0.531 |
| 14 | 0.420 | 0.447 | 0.482 | 0.476 | 0.395 | 0.426 | 0.439 | 0.503 | 0.542 | 0.498 | 0.382 | 0.404 |
| 13 | 0.364 | 0.373 | 0.418 | 0.451 | 0.334 | 0.358 | 0.370 | 0.414 | 0.464 | 0.452 | 0.321 | 0.338 |
| 12 | 0.322 | 0.337 | 0.378 | 0.406 | 0.298 | 0.317 | 0.329 | 0.372 | 0.423 | 0.415 | 0.287 | 0.301 |
| 11 | 0.300 | 0.321 | 0.365 | 0.376 | 0.284 | 0.298 | 0.306 | 0.358 | 0.399 | 0.393 | 0.268 | 0.283 |
| 10 | 0.297 | 0.323 | 0.366 | 0.373 | 0.286 | 0.303 | 0.304 | 0.356 | 0.404 | 0.380 | 0.274 | 0.285 |
| 9 | 0.308 | 0.333 | 0.383 | 0.380 | 0.305 | 0.319 | 0.320 | 0.371 | 0.421 | 0.382 | 0.282 | 0.297 |
| 8 | 0.328 | 0.348 | 0.408 | 0.410 | 0.327 | 0.339 | 0.343 | 0.389 | 0.447 | 0.408 | 0.300 | 0.311 |
| 7 | 0.352 | 0.372 | 0.434 | 0.438 | 0.349 | 0.365 | 0.366 | 0.415 | 0.473 | 0.440 | 0.317 | 0.335 |
| 6 | 0.374 | 0.392 | 0.455 | 0.469 | 0.376 | 0.390 | 0.386 | 0.441 | 0.505 | 0.469 | 0.338 | 0.350 |
| 5 | 0.389 | 0.404 | 0.479 | 0.499 | 0.401 | 0.406 | 0.400 | 0.448 | 0.535 | 0.493 | 0.356 | 0.369 |
| 4 | 0.392 | 0.409 | 0.500 | 0.519 | 0.419 | 0.418 | 0.412 | 0.452 | 0.553 | 0.523 | 0.376 | 0.377 |
| 3 | 0.387 | 0.415 | 0.506 | 0.519 | 0.423 | 0.426 | 0.410 | 0.453 | 0.537 | 0.536 | 0.385 | 0.380 |
| 2 | 0.373 | 0.411 | 0.510 | 0.490 | 0.418 | 0.423 | 0.400 | 0.452 | 0.565 | 0.493 | 0.366 | 0.369 |
| 1 | 0.392 | 0.412 | 0.496 | 0.452 | 0.413 | 0.429 | 0.429 | 0.454 | 0.551 | 0.449 | 0.359 | 0.364 |

2. Drop Experiment

A drop experiment was performed on the plastic containers 1 of Examples 1 and 2. In the drop experiment, a sample was prepared by filling the plastic container 1 with room-temperature water and then sealing the plastic container 1 by attaching the cap 13 to the spout 12. The sample was dropped three times from a height of 1.2 m with the bottom of the sample facing downward. As a result, good results were obtained in both Examples 1 and 2, with no samples exhibiting cracks.

REFERENCE SIGNS LIST

1: plastic container, 2: innermost layer, 3: repro layer, 4: adhesive resin layer, 5: gas barrier layer, 6: adhesive resin layer, 7: outermost layer, 11: screw thread, 12: spout, 13: cap, 14: body.

The invention claimed is:

1. A plastic container for containing a content, the container comprising:

in order from an inner surface side of the plastic container, an inner layer, a repro layer, an inner adhesive layer, a gas barrier layer, an outer adhesive layer, and an outer layer;

wherein the repro layer is composed of a resin composition containing a repro material obtained by recycling scrap that is generated during molding of the plastic container;

wherein the gas barrier layer is composed of an ethylene-vinyl alcohol resin;

wherein a content rate of the ethylene-vinyl alcohol resin in the plastic container is 4.5 to 5.0% by mass; and wherein a thickness of the inner adhesive layer is smaller than a thickness of the outer adhesive layer.

2. The plastic container of claim 1, wherein a ratio of a thickness of the gas barrier layer to a thickness of the inner adhesive layer or the outer adhesive layer is 4.0 or more.

3. The plastic container of claim 1, wherein the repro layer further comprises biomass resin.

* * * * *